United States Patent [19]

Taniguchi et al.

[11] Patent Number: 5,778,188
[45] Date of Patent: Jul. 7, 1998

[54] SYSTEM FOR CONTROLLING DELAYS IN A RING BY ASSEMBLING SUBFRAMES WITH A VARIABLE-DELAY BY A MASTER NODE, AND WITH A FIXED-DELAY BY OTHER NODES

[75] Inventors: Kenji Taniguchi; Hidetoshi Amari; Masashi Hirome; Keiichi Furukawa, all of Kawasaki, Japan

[73] Assignee: Fujitsu Limited, Kanagawa, Japan

[21] Appl. No.: 552,077

[22] Filed: Nov. 2, 1995

[30] Foreign Application Priority Data

Nov. 2, 1994 [JP] Japan .................. 6-269660

[51] Int. Cl.[6] .................. G06F 13/00; G06F 15/16; H04L 12/43
[52] U.S. Cl. .................. 395/200.66; 395/200.39; 395/200.51; 395/200.64; 395/200.78; 395/200.81
[58] Field of Search .................. 370/85.15, 85, 370/86, 85.12, 89, 24, 94, 100.1, 106, 463, 242; 375/3; 395/200.1, 284, 200.66, 200.39, 200.51, 200.64, 200.78, 200.81

[56] References Cited

U.S. PATENT DOCUMENTS

| | | | |
|---|---|---|---|
| 3,919,484 | 11/1975 | Maxemchuk | 370/242 |
| 4,071,706 | 1/1978 | Warren | 370/463 |
| 4,354,229 | 10/1982 | Davis et al. | 395/284 |
| 4,596,012 | 6/1986 | Reed | 370/85 |
| 4,663,748 | 5/1987 | Karbowiak et al. | 370/89 |
| 4,677,614 | 6/1987 | Circo | 370/86 |
| 4,716,575 | 12/1987 | Douros et al. | 375/3 |
| 4,736,370 | 4/1988 | Hirome et al. | 370/94 |
| 4,769,839 | 9/1988 | Preineder et al. | 370/86 |
| 4,779,087 | 10/1988 | Fukuda et al. | 340/825.05 |
| 4,841,523 | 6/1989 | Roffinella et al. | 370/89 |
| 4,845,709 | 7/1989 | Matsumoto et al. | 370/86 |
| 5,014,272 | 5/1991 | Yoshida | 370/106 |
| 5,016,248 | 5/1991 | Kudoh | 370/94.1 |
| 5,119,373 | 6/1992 | Fredricsson et al. | 370/85.15 |
| 5,128,939 | 7/1992 | Takatori et al. | 370/100.1 |
| 5,241,543 | 8/1993 | Amada et al. | 370/100.1 |
| 5,285,448 | 2/1994 | Nakayama et al. | 370/85.15 |
| 5,412,652 | 5/1995 | Lu | 370/85.12 |
| 5,519,693 | 5/1996 | Galuszka et al. | 370/24 |

FOREIGN PATENT DOCUMENTS 62-18152  1/1987  Japan.

*Primary Examiner*—Thomas C. Lee
*Assistant Examiner*—Ki S. Kim
*Attorney, Agent, or Firm*—Helfgott & Karas, P.C.

[57] ABSTRACT

In a ring transmission path, a synchronous multiplexing technique using pointer control is employed. To stabilize pointer values, at least one node is set as a master node. At the master node, the amount of delay by which to delay transmit data is made variable in order to place the transmit data in a fixed position in a transmitted frame regardless of its position in a received frame. At other nodes, the position of the transmit data in the transmitted frame is made variable in order to delay the transmit data by a fixed amount of delay. When the master node is bypassed because of a failure of the master node, etc., the adjacent node downstream detects that state and switches, automatically, to a master node.

12 Claims, 9 Drawing Sheets

SYSTEM FOR CONTROLLING DELAYS IN A RING BY ASSEMBLING SUBFRAMES WITH A VARIABLE-DELAY BY A MASTER NODE, AND WITH A FIXED-DELAY BY OTHER NODES

BACKGROUND OF THE INVENTION

1. Field of the Invention

The present invention relates to a delay control method for a ring transmission path, and a transmitting apparatus configured for a ring transmission path.

2. Description of the Related Art

In a transmitting apparatus configured for a ring transmission path, a prescribed time slot position is fixedly allocated to each node, and each node extracts multiplexed information from its own time slot position in a transmit frame received on the upstream link, assembles a transmit frame by inserting its multiplexed information into its time slot position in the received transmit frame, and relays the assembled frame with that node's reference phase on to the next node downstream. At this point, there arises a difference between the phase of the transmit frame received on the upstream link (the received phase) and the phase of the transmit frame transmitted out on the downstream link (the transmitted phase), which, after one cycle around the ring, leads to a time slot displacement from the frame one cycle before. A frame aligner circuit is therefore used to correct this time slot displacement by adjusting the phase difference occurring after one cycle to a phase difference equivalent to an integral multiple of one frame.

Such a frame aligner circuit accommodates the phase difference after one cycle by storing the transmit frame for more than one frame period. Therefore, when accommodating the phase difference by using a frame aligner circuit, the amount of relaying delay per node becomes greater than one frame period. As a result, when the transmit frame has made one round trip around the ring, the total amount of relaying delay through the ring becomes greater than (the total number of nodes on the ring×one frame period); therefore, when there are a large number of nodes on the ring, the total amount of relaying delay becomes very large. In other words, the number of nodes that can be connected to the ring transmission path is limited by the total amount of relaying delay.

One possible approach to solving the above problem is by employing in a ring transmission path, a synchronous multiplexing technique using the pointer control adopted in the Synchronous Digital Hierarchy (SDH) scheme. According to the pointer control in the SDH scheme, instead of fixedly allocating a time slot to each node, a pointer as control information is inserted in a transmit frame, with its pointer value being set to indicate the starting phase (the starting time slot position) of the multiple pieces of multiplexed information (subframes) stored in the data field of the transmit frame, and each transmitting node on the transmission channel computes a new pointer value based on the pointer value inserted in the transmit frame received from its upstream neighbor and on the relaying delay through the node, assembles a new frame for transmission by setting the starting position of the multiplexed information at the position indicated by the pointer value, and transmits it along with the pointer value on to the next node downstream. With this method, multiplexed information from each node can be synchronously multiplexed onto the transmit frame regardless of the differences in transmission delay caused by the differences in inter-node transmission links.

However, when it is attempted in a ring transmission path to accommodate the phase difference between the transmitted and received frames by using such pointer control, since the upstream end node is not fixedly determined in the ring, the pointer value that each node on the ring computes from the received transmit frame changes for each reception and, therefore, the pointer value in the transmit frame that each node transmits is not steady (that is, is not stabilized at a prescribed value). The resulting problem is the loss of the redundancy of the pointer value, which means the inability to cope with pointer value errors.

SUMMARY OF THE INVENTION

It is an object of the invention to reduce the total amount of relaying delay in a ring transmission path.

According to the present invention, there is provided a method of controlling a delay in a ring transmission path along which a plurality of nodes are connected in a ring, comprising the steps of: at at least one of the plurality of nodes, which is a master node, performing a master node operation wherein transmit data in a frame received from a node connected upstream is delayed by a delay determined so that the transmit data can be transmitted to a node connected downstream with the transmit data placed in a fixed position in a transmitted frame regardless of its position in the received frame; and at each of remaining nodes of the plurality of nodes, which is a fixed-delay node, performing a fixed-delay node operation wherein transmit data in a frame received from a node connected upstream is transmitted to a node connected downstream with the transmit data placed in such a position in a transmitted frame as determined so that the transmit data can be delayed by a fixed delay.

According to the present invention, there is also provided a transmitting apparatus suitable for use in each node on a ring transmission path along which a plurality of nodes are connected in a ring, comprising: means for determining a delay so that transmit data in a frame received from a node connected upstream can be transmitted to a node connected downstream with the transmit data placed in a fixed position in a transmitted frame regardless of its position in the received frame; means for determining a position in a transmitted frame so that transmit data in a frame received from a node connected upstream can be delayed by a fixed delay; delaying means for delaying the transmit data in the received frame; means for assembling the transmit data into a frame for transmission; and selecting means for, in the case of a master node, setting the delay determined by the delay determining means in the delaying means while selecting a fixed position as the position into which the assembling means assembles the transmit data, and for, in the case of a fixed-delay node, setting a fixed delay in the delaying means while selecting the position determined by the position determining means as the position into which the assembling means assembles the transmit data.

DESCRIPTION OF THE PREFERRED EMBODIMENTS

Figure 1:
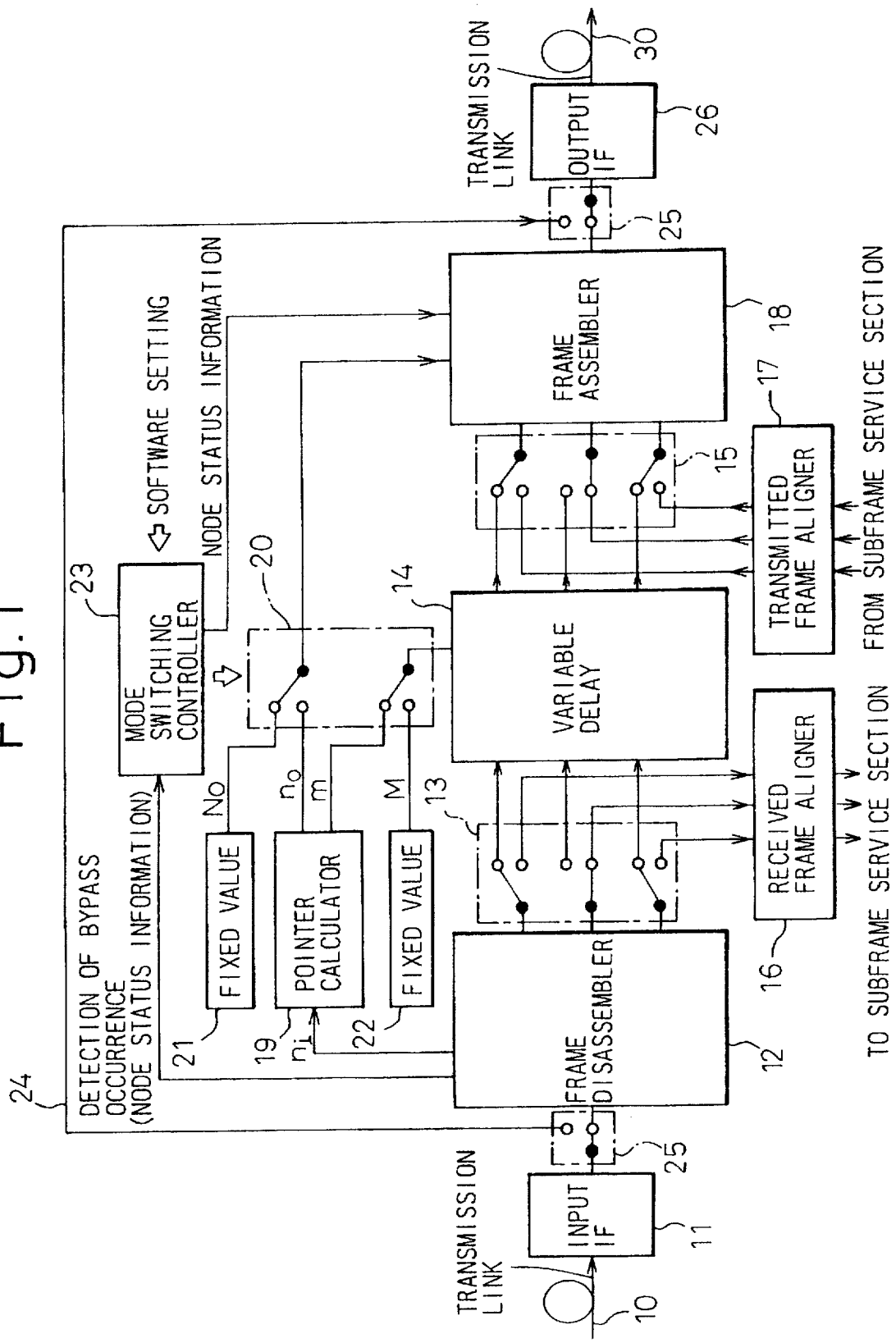
FIG. 1 is a block diagram of a transmitting apparatus according to the present invention.
Figure 2:
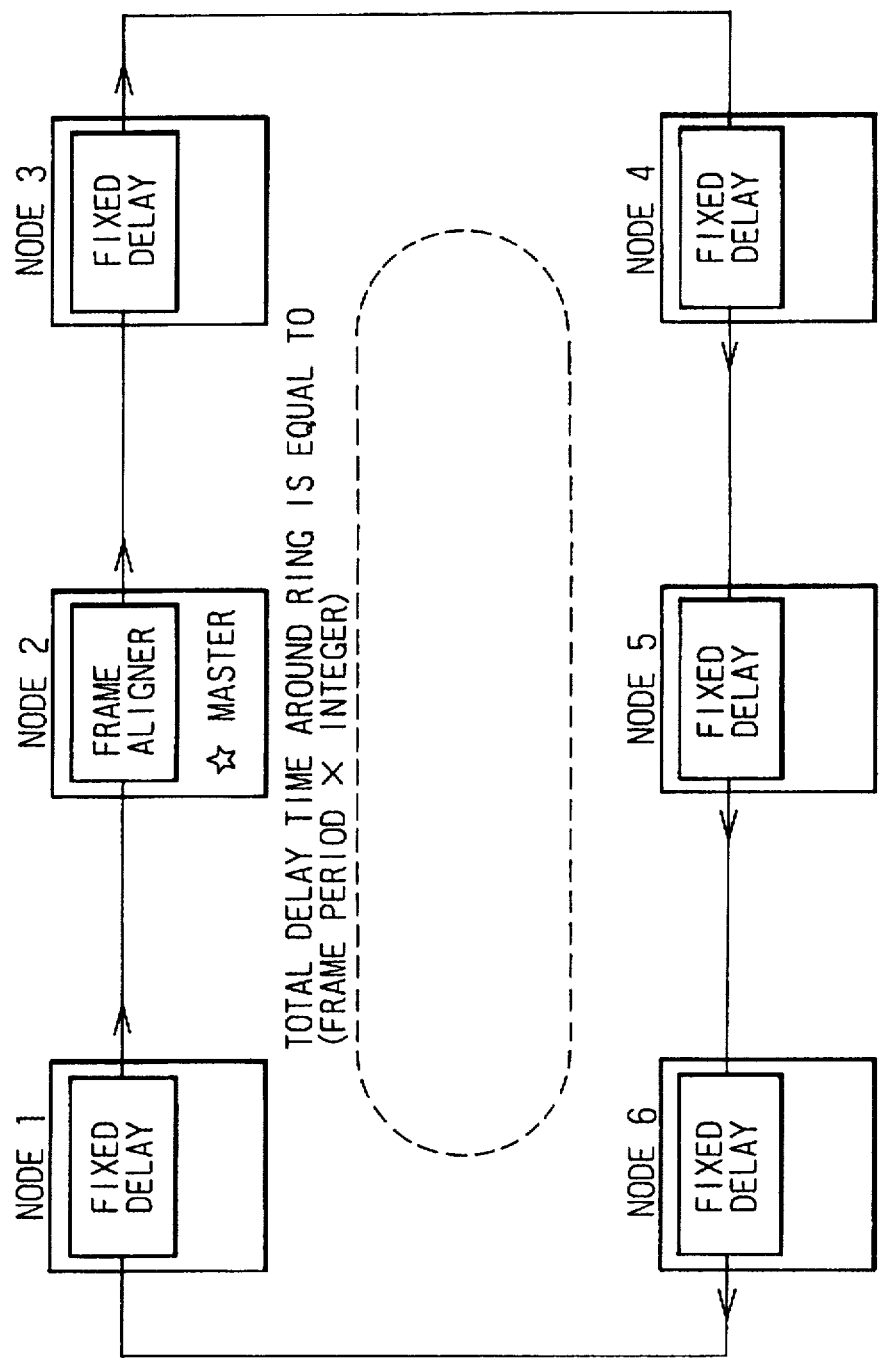
FIG. 2 is a diagram showing a ring transmission path under normal conditions.

FIG. 1 is a diagram showing a node configuration in one embodiment of the present invention. In this embodiment, six such node stations are arranged along a ring transmission path, as shown in FIG. 2, forming a transmitting apparatus. Shown in FIG. 1 is the configuration of one of the six nodes.

Figure 8:
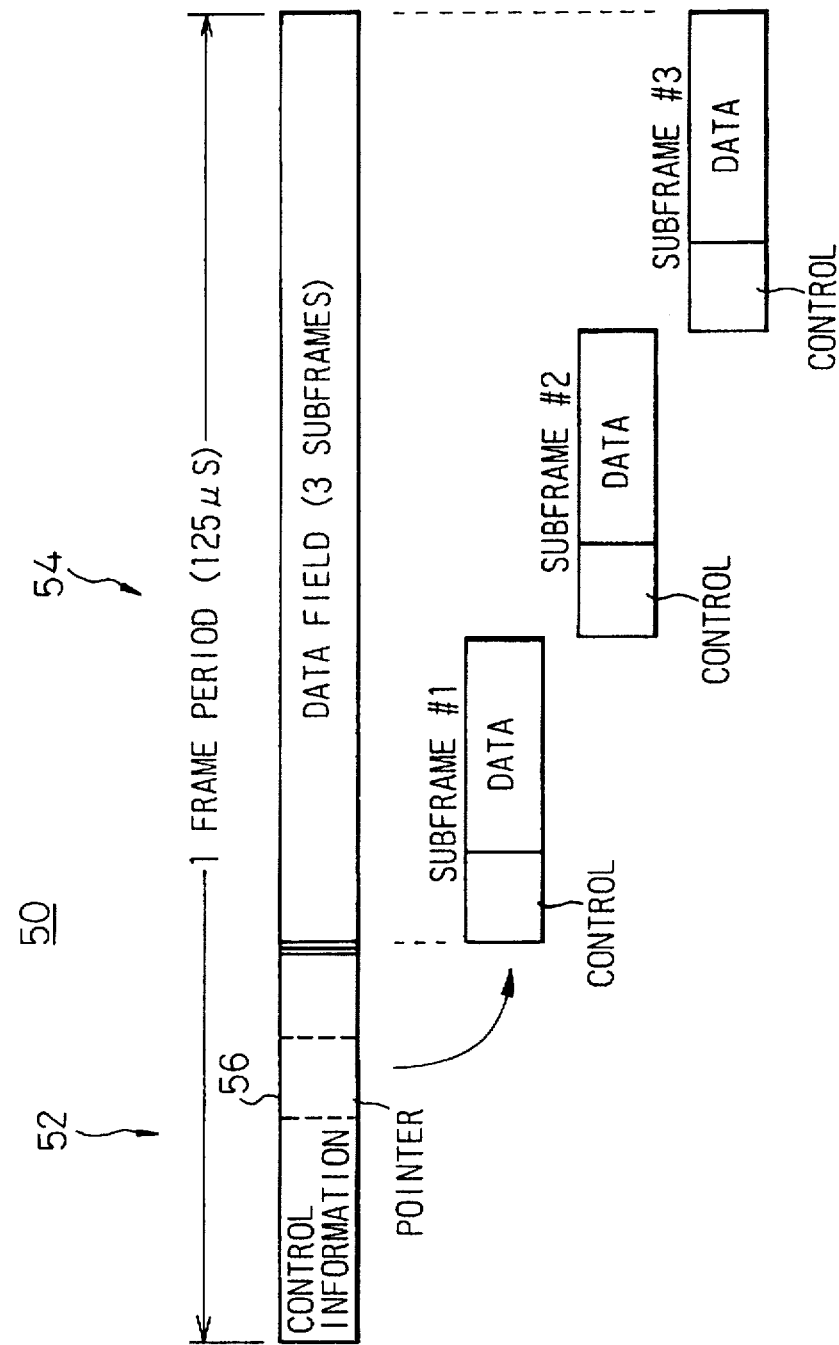
FIGS. 8 an are diagrams for explaining a frame format.

In the transmitting apparatus of this embodiment, as shown in FIG. 8, one frame period of a transmit frame 50 circulating along the ring transmission path is set to 125 µs, and the transmit frame 50 consists of a control information field 52 and a data field 54; as shown, three subframes #1 to #3 are multiplexed in the data field 54, and a pointer 56 is stored in the control information field 52, with the value of the pointer 56, as information on the starting phase of the subframes in the data field 54, set to indicate the starting position of the subframe #1. In the example of FIG. 8, the pointer value is set to "0" since the start of the subframe #1 coincides with the start of the data field 54, but when the start of the subframe #1 is at the n-th bit in the data field, as shown in the example of FIG. 9, then the pointer value is set to "n".

Figure 9:
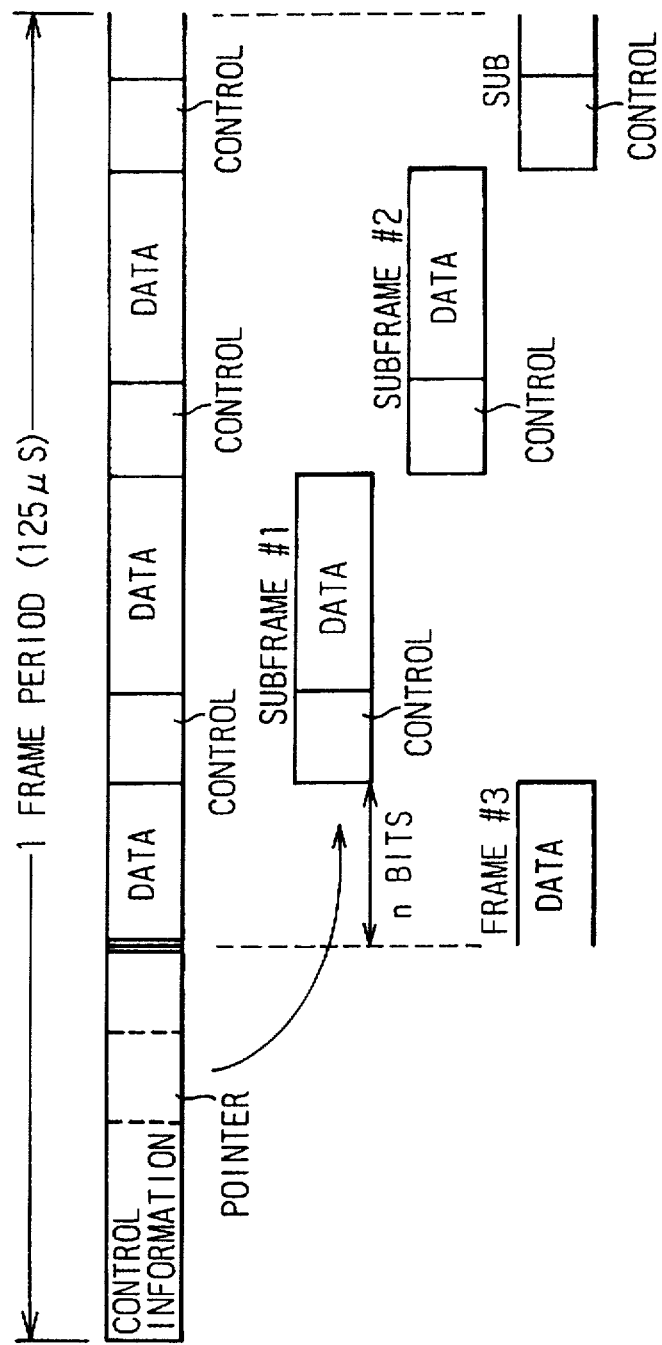

In FIG. 1, the transmit frame shown in FIG. 8 or 9, received from an upstream transmission link 10, is input into a frame disassembler 12 via an input interface section 11 and a switch section 25. In the bypass mode to be described later, the switch section 25 operates to pass the received frame unchanged on to a downstream transmission link 30 via a bypass line 24.

The frame disassembler 12 is a circuit that establishes synchronization on the transmit frame 50 received from the transmission link and extracts from the control information field 52 the pointer value 56 and the node status information from the adjacent node upstream on the ring, while, at the same time, extracting the subframes #1 to #3 from the data field.

The subframes extracted by the frame disassembler 12 are fed into a drop/through setting section (or selector) 13 which is switched so that a subframe (the subframe #2 in the illustrated example) addressed to the node is set as drop and is directed to a received frame aligner 16 and the other subframes (the subframes #1 and #3 in the illustrated example) are set as through and is directed to a variable delay unit 14.

The subframe fed into the received frame aligner 16 is next sent to a subframe service section (not shown) where appropriate servicing is performed on the subframe. The subframe sent from the subframe service section is fed to a drop/through setting section (selector) 15 via a transmitted frame aligner 17. The received frame aligner 16 and the transmitted frame aligner 17 are provided to accommodate the delay between the subframe set as drop and the frame position in the subframe service section.

The variable delay unit 14 delays the subframes set as through in accordance with a preset delay amount and passes them to a frame assembler 18 via the drop/through setting section 15. The drop/through setting section 15 selects the subframes from the variable delay unit 14 for the subframes set as through and the subframe from the transmitted frame aligner 17 for the subframe set as drop, and supplies the selected subframes to the frame assembler 18.

A mode switching controller 23 determines the delay control mode of the node, either a master mode or a fixed-delay mode, depending on software setting or on the node status information supplied from the frame disassembler 12, and performs control, in accordance with the result, as to whether fixed values or values output from a pointer calculator 19 should be selected as the delay time value to be set in the variable delay unit 14 and the pointer value to be carried in the transmitted frame, which is done by controlling a selector 20. The software setting can be accomplished, for example, by giving priority to each node and setting the node with the highest priority as a master node, or by setting the node with the smallest node number as a master node. Node status information (the node number in the illustrated example) is generated and sent to the frame assembler 18.

A fixed value setting section 21 is a register which stores a fixed pointer value $N_o$ in master mode. Further, a fixed value setting section 22 is a register for storing a fixed delay amount M in a fixed-delay mode. It is desirable that the fixed delay amount M be as small as possible, for example, 1 bit, or if possible, zero delay. The selector 20 performs switching to select the fixed values or the values output from the pointer calculator 19 as the delay time value to be set in the variable delay unit 14 and the pointer value to be carried in the transmitted frame, in accordance with the control from the mode switching controller 23.

The pointer calculator 19 is a circuit which, based on a pointer value $n_i$ in the transmit frame received on the upstream link, calculates a pointer value $n_o$ in the transmit frame to be transmitted on the downstream link and the delay amount m to be set in the variable delay unit 14. More specifically, based on the pointer value $n_i$ extracted from the received transmit frame supplied from the frame disassembler 12, when the node is in the master mode the delay amount m for a subframe, that is needed in the variable delay unit 14 when the fixed pointer value $N_o$ is set as the pointer value carried in the frame to be transmitted on the downstream link, is calculated, and the thus calculated delay amount m is set in the variable delay unit 14 via the selector 20; on the other hand, when the node is in the fixed-delay mode, the pointer value $n_o$ to be carried in the transmitted frame is calculated by taking into account the pointer value n carried in the received frame and the fixed delay amount M set in the variable delay unit 14, and is supplied to the frame assembler 18 via the selector 20.

The frame assembler 18 is a circuit which assembles the transmit frame 50, shown in FIG. 8 or 9, to be transmitted on the downstream link; the frame for transmission is assembled by setting the pointer value fed from the selector 20 in the control information field 52 and by setting the start of the subframes #1 to #3 received from the drop/through setting section 15 at the position in the data field 54 indicated by the pointer value 56, while inserting the node number as the node status information into the control information field 52 in the frame. The transmit frame 50 thus assembled in the frame assembler 18 is passed through a switch 25 and an output interface section 26 for transmission onto the downstream link.

When a failure occurs at the node, or when the node is set in maintenance mode, the switch sections 25 operate to switch the internal path to the bypass line 24 to relay the transmit frame received from the upstream node on to the downstream node by bypassing the internal circuitry from the frame disassembler 12 to the frame assembler 18.

The operation of the apparatus shown in FIG. 1 will be described below. In a first example, as shown in FIG. 2, an arbitrary node on the ring is set in master mode for operation, and the other nodes are set in fixed-delay mode for operation. In the illustrated example, node 2 acts as the master node, and the other nodes act as fixed-delay nodes.

Figure 3:
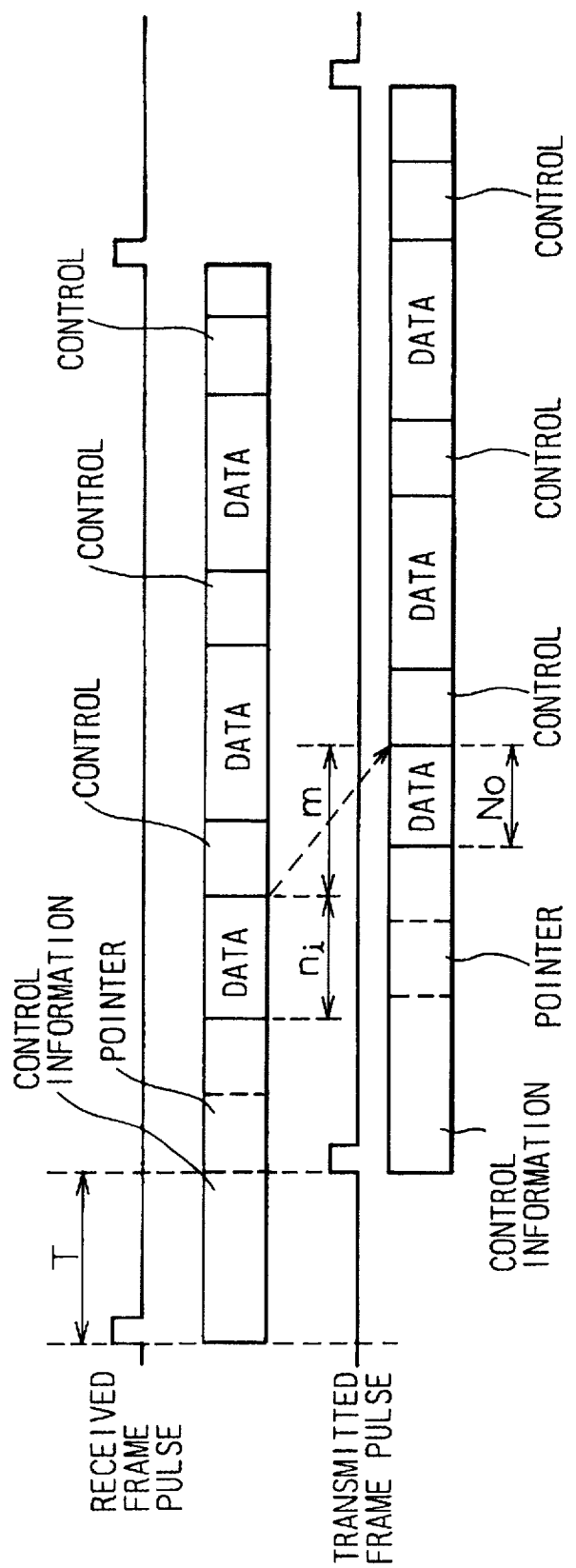
FIG. 3 is a diagram for explaining the calculating of a delay at a master node.

The node set in the master mode transmits a frame on the downstream link by setting the fixed value $N_o$ as the pointer value in the frame. In reassembling the received frame into the frame for transmission, the delay amount m to be set in the variable delay unit 14 is calculated in the pointer calculator 19 by reference to the pointer value $N_o$ set in the frame for transmission, and the thus calculated delay amount m is set in the variable delay unit 14 to accommodate the phase difference between the received and received and transmitted frames. FIG. 3 shows the phase relationship between the received and transmitted frames at this time. As can be seen from FIG. 3, the sum of the pointer value $n_i$ in the received frame and the delay amount m (=amount of phase accommodation by frame aligner) in the variable delay unit 14 is equal to the sum of the frame phase difference T between the received and transmitted frames and the pointer value (fixed value) $N_o$ in the transmitted frame. That is $$n_i+m=T+N_o$$

Hence, the delay amount m in the variable delay unit 14 is given by $$m=N_o+T-n_i$$

where $n_i$: Pointer value in received frame [bit]

$N_o$: Pointer value (fixed) in transmitted frame [bit]

m: Value of phase difference accommodation by frame aligner [bit]

T: Frame phase difference [bit]

Figure 4:
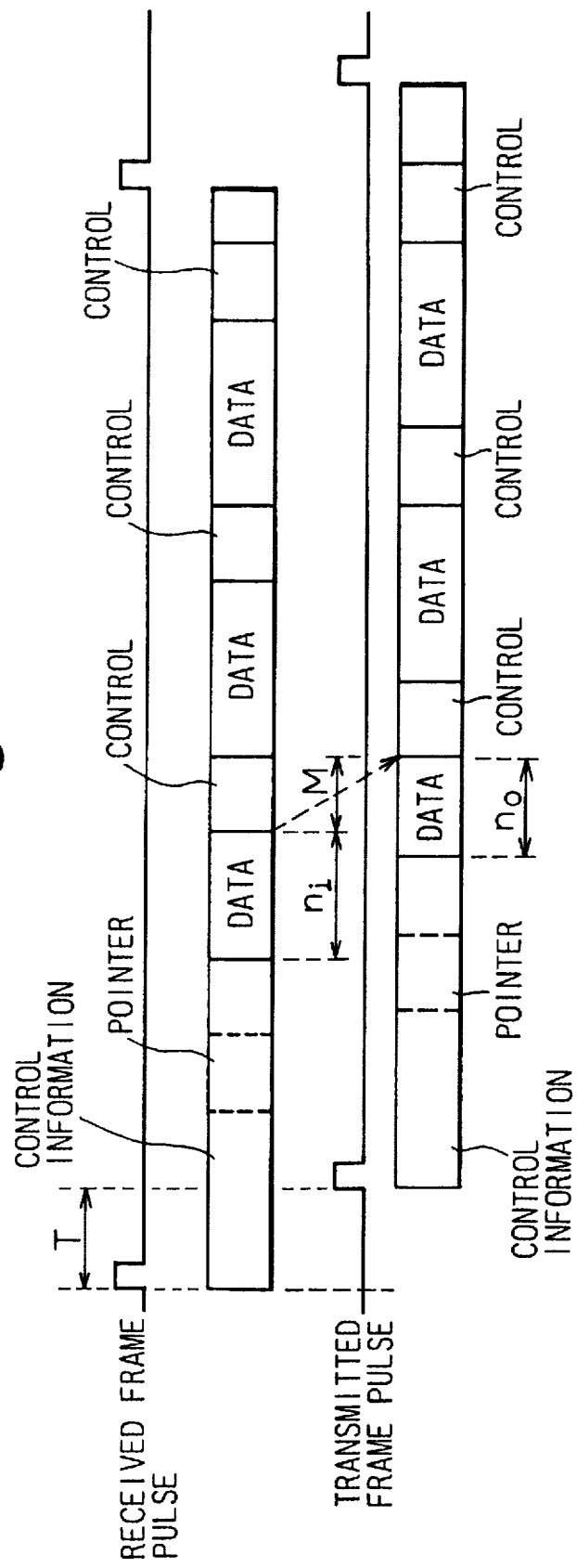
FIG. 4 is a diagram for explaining the calculation of a pointer value at a fixed-delay node.

On the other hand, in each node set in the fixed-delay mode, fixed amount M is selected as the delay amount to be set in the variable delay unit 14. In reassembling the received frame into the frame for transmission, the pointer value $n_o$ to be carried in the transmitted frame is calculated in the pointer calculator 19 by reference to the delay amount M set in the variable delay unit 14, and based on the thus calculated pointer value $n_o$, the frame for transmission is assembled and sent out on the downstream link. FIG. 4 shows the phase relationship between the received and transmitted frames at this time. As can be seen from FIG. 4, the pointer value $n_o$ to be set in the transmitted frame is given by $$n_o=M+n_i-T$$

where $n_i$: Pointer value in received frame [bit]

$n_o$: Pointer value in transmitted frame [bit]

M: Fixed delay value [bit]

T: Frame phase difference [bit]

In this way, the pointer value carried in the transmit frame transmitted from the master node is always set to a constant value, and since the other nodes along the ring transmission path sequentially determine their own pointer values by reference to the pointer value carried in the transmit frame transmitted from the master node, the pointer value in the frame transmitted from each node to its downstream neighbor is set at a constant or at least steady value. At this time, the total amount of relaying delay around the ring is equal to an integral multiple of the frame period, and this can be minimized by reducing the fixed delay amount at every node other than the master node.

Figure 5:
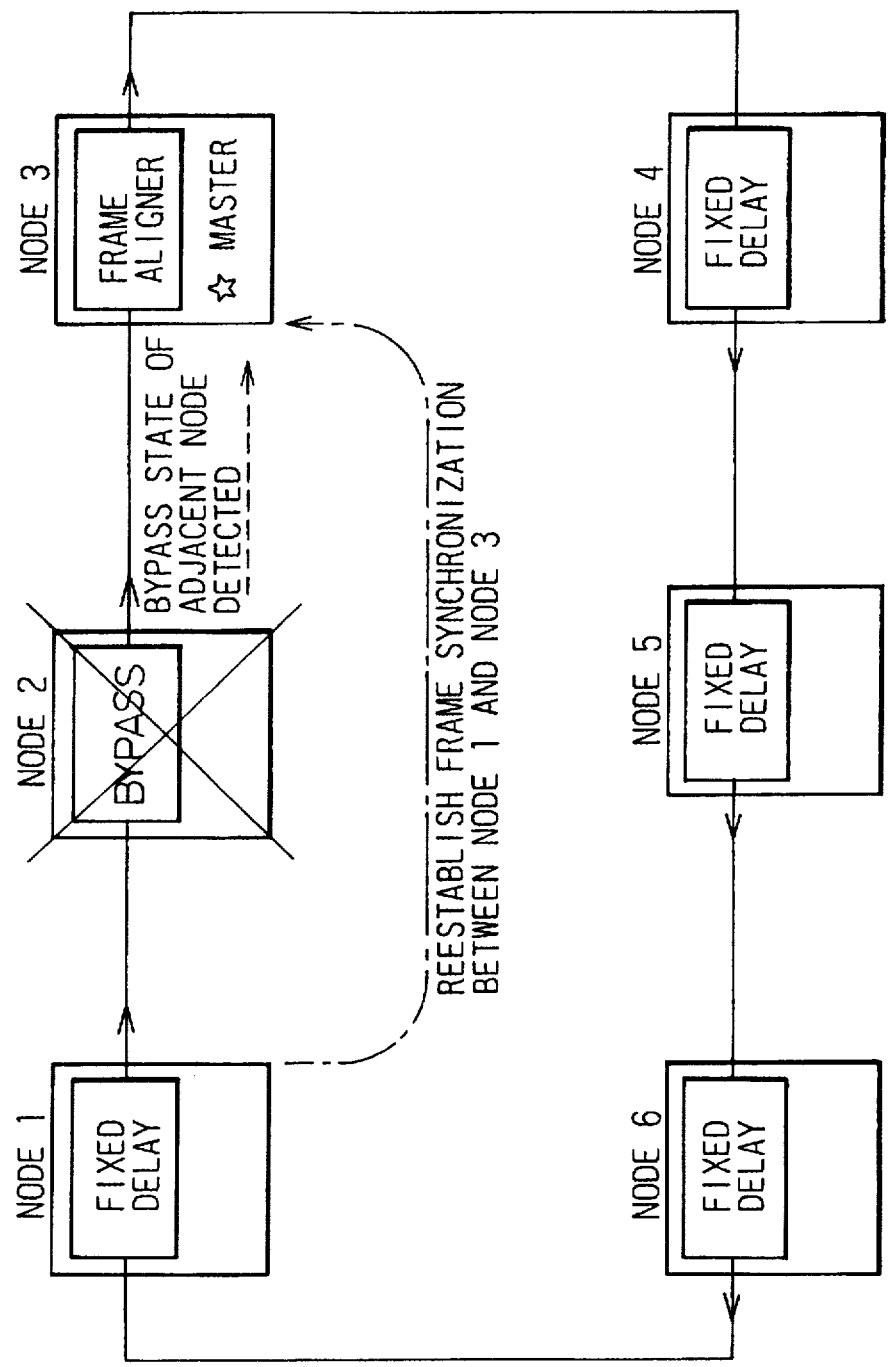
FIG. 5 is a diagram for explaining how the master node is changed in the event of the occurrence of a bypass.
Figure 6:
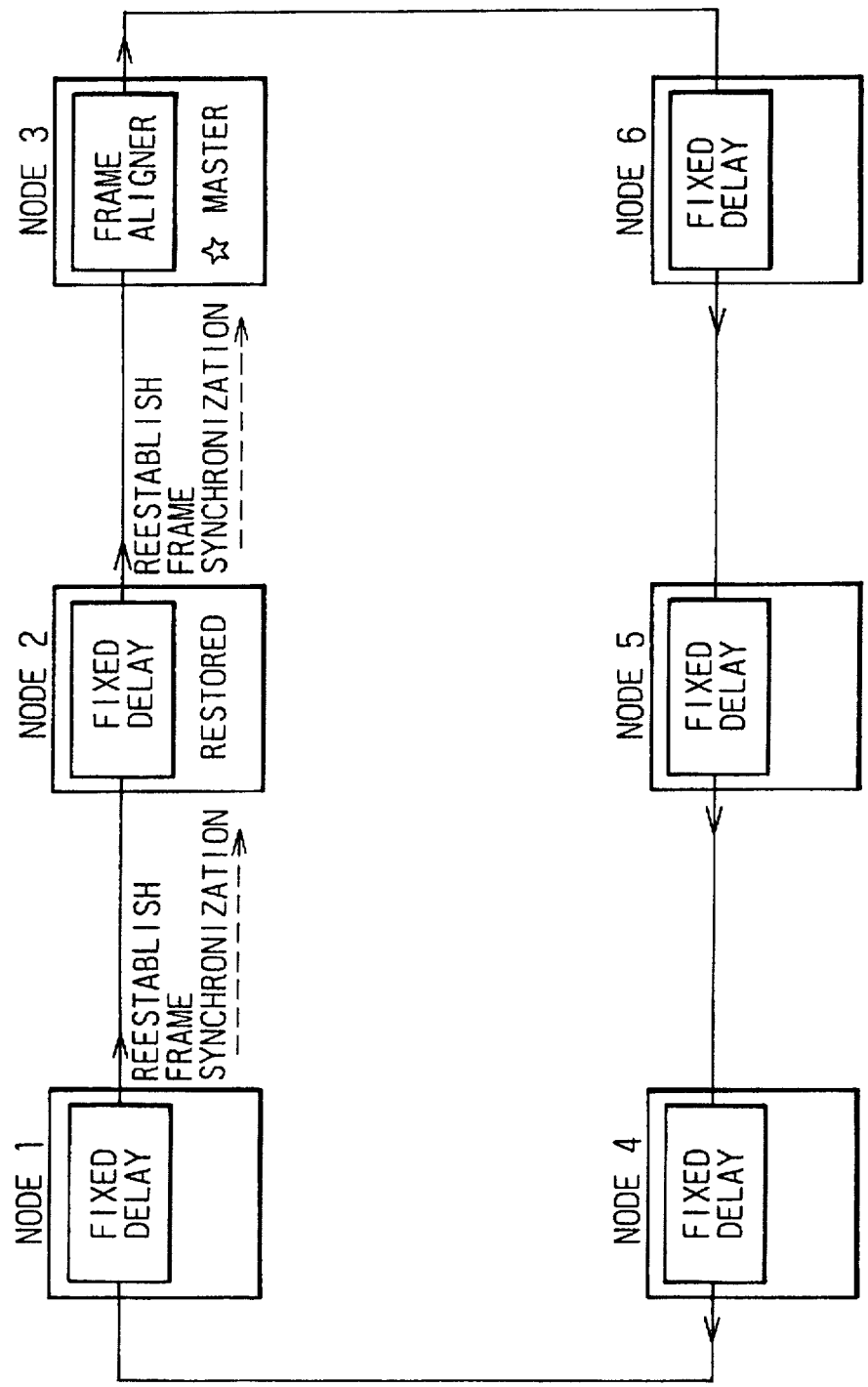
FIG. 6 is a diagram for explaining recovery from a failure.
Figure 7:
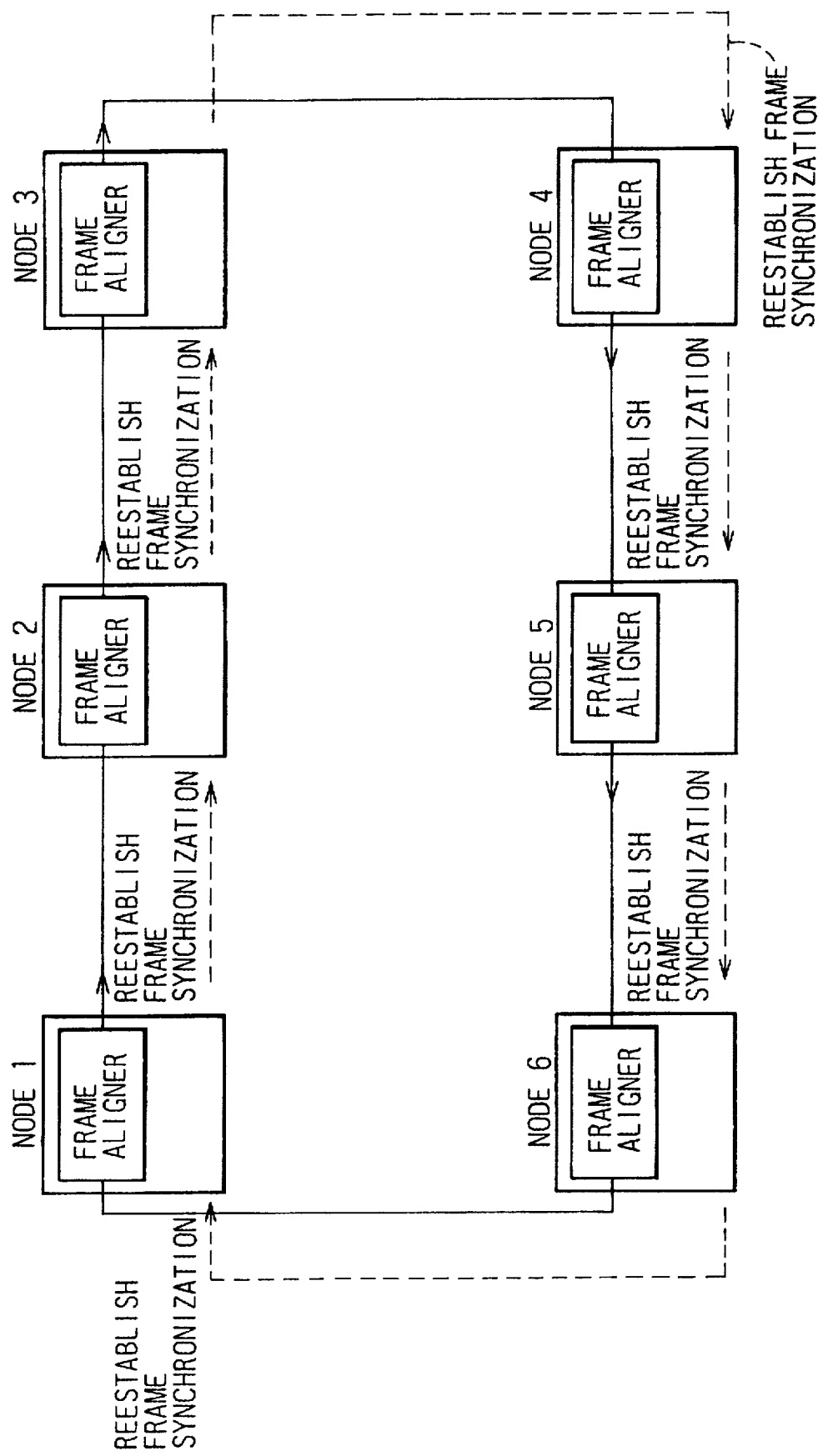
FIG. 7 is a diagram for explaining operation at the time of system startup.

Next, the operation will be described when, as shown in FIG. 5, node 2 acting as the master node is put in a bypass state due to the occurrence of a failure or the setting of maintenance mode (that is, when a frame is passed along the bypass line 24).

When the master node is put in a bypass state, and the next adjacent node (node 3 in this example) downstream of the master node along the ring detects the bypass state of the master node 2, node 3 switches by itself from the fixed-delay mode to the master mode and thereafter acts as the master node. The pointer value $n_o$ that node 3 has been transmitting until that time is retained and used as the fixed pointer $N_o$ to be inserted in the frame that the master node 3 transmits on the downstream link. By so doing, even when the master node is switched from node 2 to node 3, the pointer values in the further downstream nodes remain unchanged, and thus the pointer values in the other nodes can be held unaffected in the event of a master node failure or the like.

Further, when node 2 is put in a bypass state, as described above, since the transmitted frame from node 1 is input directly to node 3 by bypassing node 2, the frame phase difference T between the received and transmitted frame at node 3 changes from that before the bypass was switched in; therefore, frame synchronization is reestablished between node 1 and node 3 so that the transmitted frame can be received.

The following method may be used for the downstream node to detect the upstream master node going into a bypass state.

First, under normal operating conditions, the node number of the master node, carried in control information, is prenotified to all the nodes along the transmission path. Likewise, during operation, each node transmits a frame with its own node number carried as node status information. The next adjacent node (hereinafter called the submaster node) downstream of the master node recognizes its upstream adjacent node as the master node on the basis of these two pieces of information. This will be described in more detail. When the master node is put in a bypass state, frame synchronization is momentarily unlocked and then reestablished. At this time, the submaster node knows that its upstream adjacent master node has gone into the bypass state by detecting that the transmitting node number in the received frame is different from the previously notified node number of the master node, and then the submaster switches itself to a master node to take the place of that master node.

On the other hand, there may occur a situation where a fixed-delay node goes into a bypass mode due to a failure or other cause, but any node other than the submaster node does not switch to the master mode even if it has detected its upstream adjacent node going into a bypass state. In that case, however, the node reassembles a frame by reestablishing frame synchronization and recalculating the pointer value, and sends out the thus reassembled frame.

If the next adjacent node (fixed-delay node) downstream of the master node has gone into a bypass state, the adjacent node further downstream (node 4 in the example of FIG. 3) is set as a submaster node, and goes into the master mode if the master node has gone into a bypass state.

When the original master node (node 2 in the illustrated example) that has been in the bypass state recovers from the bypass state, this node first operates in the master mode as the initial condition and then, after confirming that the node has been properly connected in the ring transmission path, automatically switches to the fixed-delay mode. By so doing, two master nodes, node 2 and node 3, exist at the time of recovery and the total amount of relaying delay increases accordingly, but once reconnection to the ring transmission path is confirmed, this condition is eliminated, and further, since no change occurs in the current master node even when node 2 is restored, a situation is avoided where the pointer value in the downstream node becomes unstable. It should, however, be noted that when node 2 is restored, frame synchronization between node 1 and node 2 and between node 2 and node 3 must be reestablished.

The same applies when a fixed-delay node that has been put in a bypass state is restored.

Next, the operation at the time of system startup will be described. At this time, all the nodes on the ring transmission path operate in master mode as an initial condition and establish frame synchronization with one another, forming a transmission link between adjacent nodes. After all the nodes have been started normally and the ring transmission path established, a preset node or an arbitrary node set by network control equipment operates in the master mode, with the other nodes being switched to the fixed-delay mode for operation. The master node is thus uniquely determined on the ring transmission path.

Besides the above-described embodiment, various modifications can be made in carrying out the invention. For example, in the above embodiment, for operation only one node on the ring is set as the master node, but it will be appreciated that the invention is not limited to the illustrated examples. Rather, more than one node may be simultaneously operated in master mode, while the other nodes are operated in fixed-delay mode. For example, in the configuration shown in FIG. 2, nodes 2 and 5 may be set as master nodes, and the other nodes 1, 3, 4, and 6 as fixed-delay nodes.

In such configuration, in the section from one master node to the next master node (that is, the section from node 3 to node 4 and the section from node 5 to node 6), the pointer value in every node along that section is determined stably by reference to the fixed pointer value transmitted from the upstream master node; further, if a node failure occurs, since the section where the point values are affected is limited to within the section containing the failed node, the area affected by the failure is localized, which serves to reduce the effect on the entire system and increase reliability as compared to the configuration where only one master node is provided. When more than one master node is provided, the total amount of relaying delay increases compared to the single-master-node configuration, but compared with the prior art system in which phase adjustment is performed using frame aligners at all nodes, the total amount of relaying delay can be reduced drastically.

Furthermore, the method of detecting the upstream master node going into a bypass state is not limited to the one illustrated in the above embodiment. In one alternative embodiment, for example, the delay control mode (master mode or fixed-delay mode) and the bypass state (bypass state or normal state) of the node may be carried as node status information and transmitted to the downstream node for storage therein so that the downstream node may detect the upstream adjacent master node going into the bypass state from the change in the contents of the information that occurs when the master node has gone into the bypass state.

As described above, in the preferred embodiment of the present invention, no particular node is fixedly set as the master node. If a particular node were fixedly set as the master node, a failure of that node would cause the entire system to go down, but in the above preferred embodiment, such a problem does not occur. However, in a configuration where a particular node is fixedly set as the master station, the object of reducing the total amount of relaying delay can be accomplished, and it will therefore be appreciated that such a configuration also falls within the scope of the present invention. Furthermore, in the above-described preferred embodiment, when the master node is bypassed due to a failure or other cause, the downstream node adjacent thereto switches by itself to a master node; this eliminates the need for a supervisory control device that detects a failure of the master node and instructs some other node to become a master node. If such a supervisory control device were provided, a failure of this control device would make it impossible to switch the master node, but such a problem does not occur in the above-described preferred embodiment since there is no need to provide a specific supervisory control device. However, it will be recognized that the configuration in which the switching of the master node is performed using means such as a supervisory control device as described above, also falls within the scope of the present invention.

What is claimed is:

1. A method of controlling a delay in a ring transmission path along which a plurality of nodes are connected in a ring, comprising the steps of:

a) at least one of the plurality of nodes, which is a master node, performing a master node operation wherein a subframe in a frame having a control information field and a data field received from a node connected upstream is delayed by a variable delay determined so that the subframe can be transmitted to a node connected downstream with the subframe placed in a fixed position relative to a start of said data field in a transmitted frame regardless of the position of the subframe in the received frame; and b) at each of remaining nodes of the plurality of nodes, which is a fixed-delay node, performing a fixed-delay node operation wherein a subframe in a frame received from a node connected upstream is transmitted to a node connected downstream with the subframe placed in a variable position relative to said start of said data field of said transmitted frame as determined so that the subframe can be delayed by a fixed delay.

2. A method according to claim 1, further comprising the step of c) when the node acting as the master node is bypassed, changing one of the nodes acting as the fixed-delay nodes to the master node.

3. A method according to claim 2, wherein in step c), a node adjacent downstream of the bypassed master node changes by itself from a fixed-delay node to the master node by detecting that the master node adjacent upstream thereof has been bypassed.

4. A method according to claim 2, wherein in step c), the variable position of the subframe in the transmitted frame when the node was the fixed-delay node, is used as the fixed position of the subframe in the transmitted frame when the node is turned into the master node.

5. A method according to claim 3, wherein step c) includes the substeps of:

i) prenotifying an identifier of the node acting as the master node to all nodes acting as the fixed-delay nodes;

ii) successively notifying an identifier of each node to a node adjacent downstream thereof;

iii) at each node acting as a fixed-delay node, determining, based on the notification in substep i) and the notification in substep ii), whether the node adjacent upstream thereof is a master node or not, and if the node adjacent upstream is the master node, then whether the master node has been bypassed; and iv) at a node that has determined in substep iii) that the node adjacent upstream is the master node and that the master node has been bypassed, changing the node operation from the fixed-delay node operation to the master node operation.

6. A method according to claim 2, further comprising the step of e) at nodes other than at least one predetermined node, changing the node operation from a master mode operation to a fixed-delay mode operation after frame synchronization has been established during system startup.

7. A method according to claim 1, wherein in step a), the master node operation is performed at more than one node.

8. A method of controlling a delay in a ring transmission path along which a plurality of nodes are connected in a ring, comprising the steps of:

a) at at least one of the plurality of nodes, which is a master node, performing a master node operation wherein a subframe in a frame received from a node connected upstream is delayed by a variable delay determined so that the subframe can be transmitted to a node connected downstream with the subframe placed in a fixed position in a transmitted frame regardless of the position of the subframe in the received frame;

b) at each of remaining nodes of the plurality of nodes, which is a fixed-delay node, performing a fixed-delay node operation wherein subframe in a frame received from a node connected upstream is transmitted to a node connected downstream with the subframe placed in such a variable position in a transmitted frame as determined so that the subframe can be delayed by a fixed delay;

c) when the node acting as the master node is bypassed, changing one of the nodes acting as the fixed-delay nodes to the master node; and d) at the node recovered from the bypass state, changing the node operation from the master node operation to the fixed-delay node operation after establishing frame synchronization.

9. A transmitting apparatus suitable for use in each node on a ring transmission path along which a plurality of nodes are connected in a ring, comprising:

means for determining a variable delay so that a subframe in a frame having a control information field and a data field received from a node connected upstream can be transmitted to a node connected downstream with the subframe placed in a fixed position relative to a start of said data field in a transmitted frame regardless of the position of the subframe in the received frame;

means for determining a variable position relative to said start of said data field in a transmitted frame so that said subframe in a frame received from a node connected upstream can be delayed by a fixed delay;

delaying means for delaying the subframe in the received frame;

means for assembling the subframe into a frame for transmission; and selecting means for, in the case of a master node, setting the variable delay determined by the delay determining means in the delaying means while selecting a fixed position as the position into which the assembling means assembles the subframe and for, in case of a fixed-delay node, setting a fixed delay in the delaying means while selecting the variable position determined by the position determining means as the position into which the assembling means assembles the subframe.

10. A transmitting apparatus according to claim 9, further comprising:

means for bypassing a node; and means for changing the selection in the selecting means from the fixed-delay node selection to the master node selection when a node that is a master node is bypassed.

11. A transmitting apparatus according to claim 10, further comprising means for detecting that the upstream adjacent master node has been bypassed, wherein the selection changing means changes the selection in the selecting means from the fixed-delay node selection to the master node selection when the detecting means has detected the upstream adjacent master node being bypassed.

12. A method according to claim 10, wherein, when the selection in the selection changing means is changed from the fixed-delay node selection to the master node selection, the variable position of the subframe in the transmitted frame when the node was a fixed-delay node is used as the fixed position of the subframe in the transmitted frame when the node is turned into the master node.

* * * * *